United States Patent
Tachibana (10) Patent No.: US 10,014,538 B2
(45) Date of Patent: Jul. 3, 2018

(54) FUEL CELL SYSTEM AND A METHOD OF DETECTING A HYDROGEN GAS LEAK

(71) Applicant: TOYOTA JIDOSHA KABUSHIKI KAISHA, Toyota-shi, Aichi-ken (JP)

(72) Inventor: Minoru Tachibana, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 190 days.

(21) Appl. No.: 14/932,304

(22) Filed: Nov. 4, 2015

(65) Prior Publication Data

US 2016/0141678 A1    May 19, 2016

(30) Foreign Application Priority Data

Nov. 13, 2014  (JP) ................. 2014-230633

(51) Int. Cl.
  *H01M 8/04*  (2016.01)
  *H01M 8/04664*  (2016.01)
  (Continued)

(52) U.S. Cl.
  CPC ... *H01M 8/04671* (2013.01); *H01M 8/04097* (2013.01); *H01M 8/04223* (2013.01); *H01M 8/04225* (2016.02); *H01M 8/04302* (2016.02); *H01M 8/04388* (2013.01); *H01M 8/04395* (2013.01); *H01M 8/04753* (2013.01); *H01M 8/04776* (2013.01)

(58) Field of Classification Search
  CPC ......... H01M 8/04671; H01M 8/04097; H01M 8/04225; H01M 8/04302
  See application file for complete search history.

(56) References Cited

U.S. PATENT DOCUMENTS 7,442,452 B2   10/2008  Miura
2001/0001287 A1  5/2001  Ueno et al.
(Continued)

FOREIGN PATENT DOCUMENTS

CN       1871735 A    11/2006
CN     101911358 A    12/2010
(Continued)

*Primary Examiner* — Jonathan G Jelsma
(74) *Attorney, Agent, or Firm* — Finnegan, Henderson, Farabow, Garrett & Dunner LLP (57) ABSTRACT

The fuel cell system is provided with the hydrogen gas circulation system that supplies hydrogen gas to the fuel cell while merging the hydrogen gas discharged from the fuel cell with the newly supplied hydrogen gas, a hydrogen gas supply valve that controls the amount of hydrogen gas supplied to the hydrogen gas circulation system, an initial pressurization unit that pressurizes the hydrogen gas circulation system by temporarily opening the hydrogen gas supply valve at the start of the fuel cell, and a re-pressurization and gas leak detection unit that re-pressurizes the hydrogen gas circulation system by opening the hydrogen gas supply valve when a given level of pressure drop is found in the pressure detected by the pressure detection unit after the pressurization by the initial pressurization unit and detects a hydrogen gas leak from the hydrogen gas circulation system based on the pressure detected by the pressure detection unit in a given timing after the pressurization.

9 Claims, 5 Drawing Sheets

(51) Int. Cl.
  *H01M 8/04089* (2016.01)
  *H01M 8/04746* (2016.01)
  *H01M 8/04225* (2016.01)
  *H01M 8/04302* (2016.01)
  *H01M 8/04223* (2016.01)
  *H01M 8/0438* (2016.01)

(56) References Cited

U.S. PATENT DOCUMENTS

| | | |
|---|---|---|
| 2006/0166060 A1 | 7/2006 | Miura |
| 2007/0207355 A1* | 9/2007 | Yoshida ............ H01M 8/04097 429/444 |
| 2009/0047553 A1 | 2/2009 | Kizaki |
| 2009/0169927 A1* | 7/2009 | Sato ................... H01M 8/0263 429/412 |
| 2009/0239105 A1* | 9/2009 | Yoshida ............ H01M 8/04432 429/424 |
| 2010/0248060 A1* | 9/2010 | Bono ................ H01M 8/04328 429/443 |
| 2010/0266920 A1 | 10/2010 | Kanie et al. |
| 2012/0015268 A1 | 1/2012 | Yoshida et al. |

FOREIGN PATENT DOCUMENTS

| | | |
|---|---|---|
| JP | 2005-011703 A | 1/2005 |
| JP | 2006-086025 A | 3/2006 |
| JP | 2009-158371 A | 7/2009 |
| JP | 2010-238495 | 10/2010 |
| KR | 10-0974050 B1 | 8/2010 |

* cited by examiner

Fig.4

FUEL CELL SYSTEM AND A METHOD OF DETECTING A HYDROGEN GAS LEAK

CROSS REFERENCE TO RELATED APPLICATION

The present application claims priority from Japanese application P2014-230633 filed on Nov. 13, 2014, the content of which is hereby incorporated by reference into this application.

BACKGROUND

Field

The present invention relates to a fuel cell system and a method of detecting a hydrogen gas leak.

Related Art

In the conventional fuel cell system, as described in JP2010-238495A for example, a hydrogen gas leak has been detected based on the pressure drop of hydrogen gas under a condition where a hydrogen gas circulation system connected to a fuel cell is pressurized and sealed off at the startup of the fuel cell.

SUMMARY

However, according to the prior art, when air is present in the hydrogen circulation system and hydrogen gas is injected to detect any gas leak, the hydrogen will react with oxygen in the air in a combustion reaction, thus reducing the pressure of the hydrogen gas. For this reason, the prior art had a problem of false detections even if there is no gas leak in the hydrogen gas circulation system. Example of situations where air is present in the hydrogen gas circulation system include a case when the fuel cell system is left unoperated for a long period of time (e.g. 20 days or more). This is because, during the period of non-operation, the air enters into the hydrogen circulation system from an air system permeating through the fuel cell.

The present invention was made to address at least part of the problem described above, and stay be implemented in the following aspects:

(1) One aspect of be present invention is a fuel cell system provided with a fuel cell. The fuel cell system may comprise a hydrogen gas circulation system that supplies hydrogen gas to the fuel cell while merging the hydrogen gas discharged from the fuel cell with the newly supplied hydrogen gas, a hydrogen gas supply valve that controls the amount of hydrogen gas supply to the hydrogen gas circulation system, a pressure detection unit that detects the internal pressure of the hydrogen circulation system, an initial pressurization unit that pressurizes the hydrogen circulation system by temporarily opening the hydrogen gas supply valve, and a re-pressurization and gas detection unit that re-pressurizes the hydrogen gas circulation system after the pressurization by the initial pressurization unit by opening the hydrogen supply valve when a given level of drop is found in the pressure detected by the pressure detection unit after the pressurization by the initial pressurization unit and detects any leak of hydrogen gas from the hydrogen gas circulation system in a given timing after the pressurization based on the pressure detected by the pressure detection unit. According to the fuel cell system of the configuration described above, the air present in the hydrogen circulation system may be removed through combustion reactions by having the hydrogen gas circulation system pressurized by the initial pressurization unit. Then, the system is re-pressurized by the re-pressurization and gas detection unit. Therefore, any detection error of hydrogen gas leak due to the presence of air in the hydrogen gas circulation system may be prevented.

(2) In the fuel cell system of the aspect described above, the given timing may be chosen at the start of the power generation operation by the fuel cell. According to this fuel cell system, it is possible to make a provisional judgment only by pressurization by the initial pressurization unit at the start of the fuel cell and to perform a formal detection of gas leak at the start of the power generation operation by the fuel cell. Therefore, the gas leak detection does not delay the start of the power generation operation by the fuel cell.

(3) In the fuel cell system of the aspect described above, the hydrogen gas circulation system may be provided with a hydrogen gas supply channel for passing the hydrogen gas supplied by the hydrogen supply valve to the fuel cell and a circulation channel for circulating the hydrogen gas discharged from the fuel cell to the hydrogen gas supply channel. According to this fuel cell system, it is possible to detect a gas leak from the hydrogen gas circulation system comprising the hydrogen gas supply channel, the hydrogen gas channel within the fuel cell, and the circulation channel.

(4) The fuel cell system of the aspect described above may comprise an air system including a channel and a valve for supplying air to the fuel cell, an air compressor tot sending air to the air system, an air pressure detection unit that detects the internal pressure of the air system, a rotational speed control unit that raises the rotational speed of the air compressor and keeps the rotational speed at a given level for a given period of time, and a failure detection unit that detects a failure of the valve based on the pressure fluctuations detected by the air pressure detection unit during the given period of time. According to this fuel cell system, it is possible to detect the valve failure under a condition of enough air to affect the detection results (i.e. with enough pressure sensitivity), which enables to also detect a failure in the air system.

(5) Another aspect of the present invention is a method of detecting a hydrogen gas leak of the fuel cell system provided with a fuel cell, a hydrogen gas circulation system that supplies hydrogen gas to the fuel cell while merging the hydrogen gas discharged from the fuel cell with the newly supplied hydrogen gas, a hydrogen gas supply valve that controls the amount of hydrogen gas supplied to the hydrogen gas circulation system, and a pressure detection unit that detects the internal pressure of the hydrogen gas circulation system. The hydrogen gas leak detection method may comprise pressurizing the hydrogen gas circulation system by temporarily opening the hydrogen gas supply valve, and re-pressurizing the hydrogen gas circulation system by opening the hydrogen gas supply valve when a given level of pressure drop is detected by the pressure detection unit and detecting a hydrogen gas leak from the hydrogen gas circulation system based on the pressure detected by the pressure detection unit at a givers timing after the pressurization. According to the hydrogen gas leak detection method of this configuration, it is possible to prevent any detection error when air is present in the hydrogen gas circulation system, as is the case with the fuel cell system of the aspect described above.

The present invention may also be implemented in various aspects other than the fuel cell system and hydrogen gas leak detection method. It may be implemented in aspects such as a vehicle having a fuel cell system, a computer program for performing a function corresponding to each process of the hydrogen gas leak detection method, and a non-transitory storage medium that stores the computer program.

Embodiments of the present invention will be described below.

DESCRIPTION OF THE EMBODIMENTS

A. Overall Configuration

Figure 1:
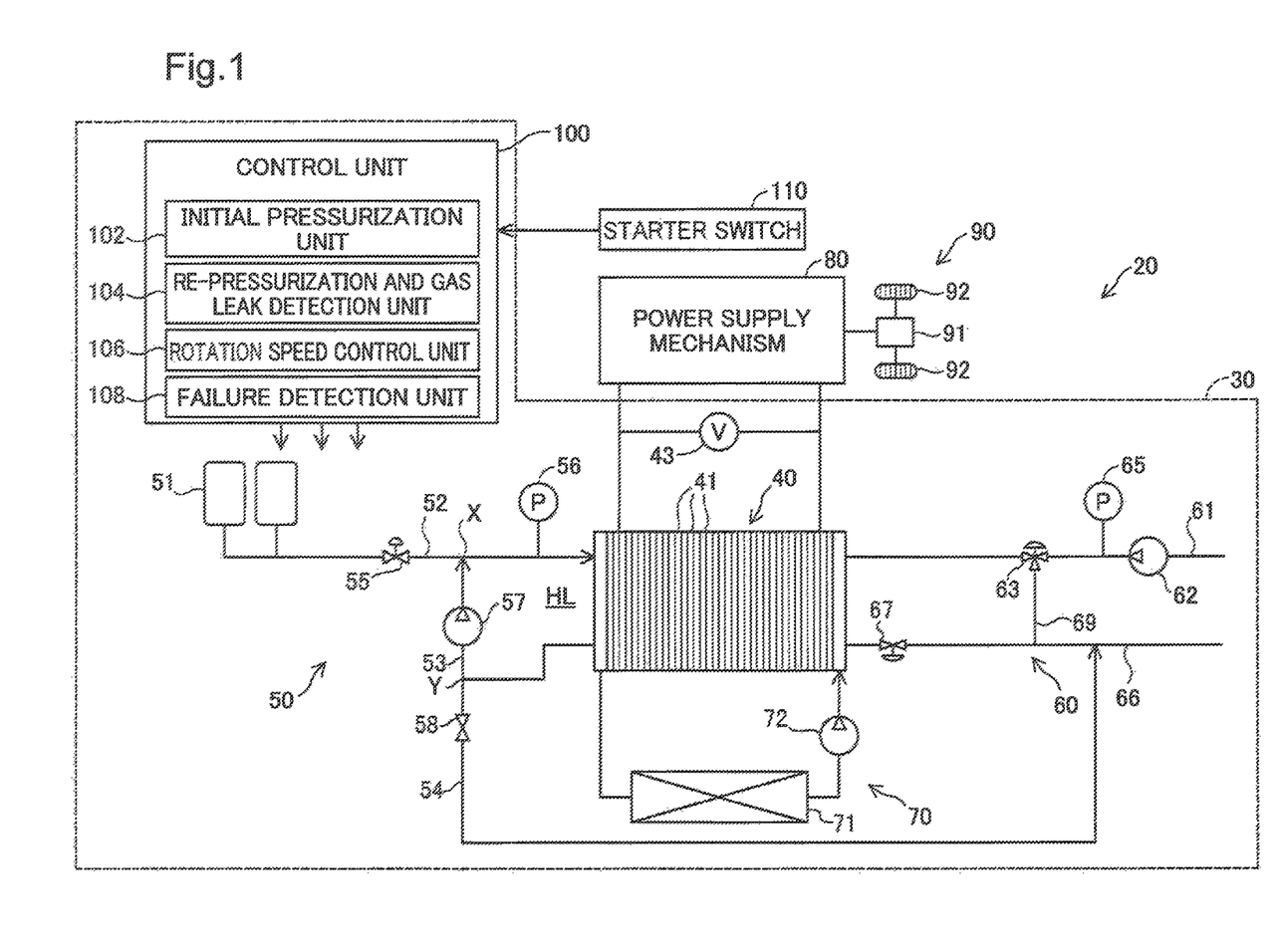
FIG. 1 is an illustrative drawing schematically showing the configuration of a fuel cell vehicle as one embodiment of the present invention.

FIG. 1 is an illustrative drawing schematically showing the configuration of a fuel cell vehicle 20 as one embodiment of the present invention. The fuel cell vehicle 20 is a four-wheel automobile, and is provided with a fuel cell system 30, power supply mechanism 80, and a driving mechanism 90.

A fuel cell system 30 is provided with a fuel cell stack 40, a hydrogen gas supply and discharge mechanism 50, an air supply and discharge mechanism 60, a cooling water circulation mechanism 70, and a control unit 100.

The fuel cell stack 40 is a unit that generates power by electro-chemical reactions of hydrogen with oxygen, and is formed by layering multiple single cells 41. The single cell 41 is composed of an anode, a cathode, electrolyte and separators and so forth. Numerous types are applicable as the fuel cell stack 40, and a solid polymer type is to be used in the present embodiment.

The hydrogen gas supply and discharge mechanism 50 supplies and discharges hydrogen gas to and from the fuel cell stack 40. Here, hydrogen gas means a hydrogen-rich gas and does not necessarily mean pure hydrogen. The hydrogen gas supply and discharge mechanism 50 is provided with a hydrogen tank 51, hydrogen gas supply channel 52, a hydrogen gas circulation channel 53, and a hydrogen gas discharge channel 54.

The hydrogen tank 51 stores high-pressure hydrogen gas. The hydrogen gas supply channel 52 is a pipeline for supplying hydrogen gas in the hydrogen tank 51 to the fuel cell 10. The hydrogen gas circulation channel 53 is a pipeline for merging the unconsumed hydrogen gas discharged from the fuel cell stack 40 into the hydrogen gas supply channel 52. The hydrogen gas discharge channel 54 is a pipeline that connects between the hydrogen gas circulation channel 53 and an air discharge channel 66 (to be described later) provided in the air supply and discharge mechanism 60.

On the upstream side of the connection point X between the hydrogen gas circulation channel 53 and the hydrogen gas supply channel 52 in the hydrogen gas supply channel 52, an injector 55 is provided as a hydrogen gas supply valve. The injector 55 adjusts the rate of gas flow (or hydrogen molarity) that is supplied to the downstream side by changing at least either of the opening area (aperture) and the opening duration of the valve in order to supply hydrogen gas at a required flow rate. The gas flow rate is adjusted by open-shut valve operations of the injector 55, while the injector 55 may be interpreted as a control valve (decompression valve, or regulator) because the pressure of the gas supplied to the downstream side is reduced as compared to that on the upstream side.

The hydrogen gas supply and discharge mechanism 50 is provided with a pressure sensor 56 as a pressure detection unit. The pressure sensor 56 detects the pressure of hydrogen gas in a hydrogen supply channel 52 on the downstream side of the connection point X.

On the downstream side of the connection point Y between the hydrogen gas discharge channel 54 and the hydrogen gas circulation channel 53 in the hydrogen gas circulation channel 53, a hydrogen circulation pump 57 is installed. Hydrogen gas is circulated in the hydrogen gas circulation channel 53 by the hydrogen circulation pump 57. Since the flow path where the hydrogen gas circulates, that is, downstream portion of the connection point X in the hydrogen supply channel 52, the hydrogen channel within the fuel cell stack 40, and the hydrogen circulation channel 53 are all depressurized by the injector 55, these channels and parts equipped therewith (the pressure sensor 56, hydrogen circulation pump 57 etc.) will be collectively called a hydrogen low pressure system HL. This hydrogen low pressure system HL corresponds to the "hydrogen gas circulation system."

In the middle of the hydrogen gas discharge channel 54 is provided a purge valve 58. The purge valve 58 gets opened when impurities increase in the hydrogen gas circulation channel 53 in order to discharge them from an air discharge channel.

The air supply and discharge mechanism 60 that supplies and discharges air as oxidizing gas to and from the fuel cell stack 40 is provided with an air supply channel 61, an air discharge channel 66, and a bypass 69. The air supply channel 61 and the air discharge channel 66 are each a flow path that connects the fuel cell stack 40 with an air opening provided in each of the air supply channel 61 and the air discharge channel 66. At the air opening of the air supply channel 61 is provided an air cleaner. The bypass 69 is a channel that connects between the air supply channel 61 and the air discharge channel 66.

The air supply and discharge mechanism 60 is provided with an air compressor 62. The air compressor 62 is installed in the middle of the air supply channel 61 and draws in air from the air opening of the air supply channel 61 to compress it. The location where the air compressor 62 is installed is a position closer to the air opening than the connection point between the air supply channel 61 and the bypass 69.

The air supply and discharge mechanism 60 is provided with a dividing shut valve 63. The dividing shut valve 63 is installed at the connection point between the air supply channel 61 and the bypass 63 and divides the compressed air earning from the air compressor 62 into the bypass 63 and the downstream side of the air supply channel 61. This type of valve is also called a three-way valve. The word "divide" in this context means both splitting the air flow into two streams and allocating 100% of the flow to either one of the channels. When the aperture of the dividing shut vale 63 is 100%, 100% of the compressed air flow from the air compressor 62 is sent to the fuel cell stack 40.

The air supply and discharge mechanism 60 is provided with a pressure sensor 65. The pressure sensor 65 detects the air pressure within the air supply channel 61 at a position between the air compressor 62 and the dividing shut valve 63.

The air supply and discharge mechanism 60 is provided with a pressure adjusting shut valve 67. The pressure adjusting shut valve 67 is installed at the air discharge channel 66 and adjusts the sectional area thereof depending on the size of the valve aperture. The pressure adjusting shut valve 67 is provided with a pilot valve that cancels the pressure difference between its own upstream and downstream sides under a condition of zero aperture of the valve.

Air passing through the pressure adjusting shut valve 67 goes through the connection point in the air supply and discharge mechanism 60 with the bypass 69 to be discharged to the atmosphere via the air opening.

The cooling water circulation mechanism 70 that cools down the fuel cell stack 40 is provided with a radiator 71 and a cooling water circulation pump 72. The cooling water circulation mechanism 70 circulates cooling water between the single cell 41 and the radiator 71 in order to control the operating temperature of the single cell 41. Being circulated this way, the cooling water performs a heat-absorbing function in the single cell 41 and a heat-dissipating function in the radiator 71.

The power supply mechanism 80 is connected to the fuel cell stack 40 and supplies power generated by the fuel cell stack 40 to electrically powered equipment. Examples of the electrically powered equipment include a motor 91 that drives a driving wheel 92 installed in the driving mechanism 90 and a compressor for air conditioning (not shown).

The operation of the fuel cell system 30 is controlled by the control unit 100. The control unit 100 is a microcomputer provided with CPU, RAM and ROM inside. The control unit 100 controls each operation of the injector 55 in the fuel cell system 30, the valves 58, 63, 67 described above, and the air compressor 62 and the like. In order to perform these controls, the control unit 100 receives various signals. These signals include, for example, output signals from a starter switch 110 for starting the pressure sensors 56, 65, a voltage sensor 43 that detects power generation voltage of the fuel cell stack 40, and the fuel cell stack 40. The starter switch 110 is installed on an operation board in a vehicle cabin to be operated by a driver.

As more functional features, the control unit 100 is provided with an initial pressurization unit 102 and a re-pressurization and gas leak detection unit 104, and detects a hydrogen gas leak from the hydrogen low pressure system HL during a period from the startup of the fuel cell stack 40 to the start of the power generation operation. The initial pressurization unit 102 pressurizes the hydrogen low pressure system HL by opening the injector 55 at the startup of the fuel cell system 30. The re-pressurization and gas leak detection unit 104 re-pressurizes the hydrogen low pressure system HL when a predetermined pressure drop of hydrogen gas is detected by the pressure sensor 56 after the pressurization by the initial pressurization unit 102 and detects a hydrogen gas leak from the hydrogen low pressure system HL based on the pressure detected by the pressure sensor 56 at the start of the power generation operation. Each configuration of the parts 102, 104 will be described in detail below.

B. Control of Hydrogen Gas Circulation System

Figure 2:
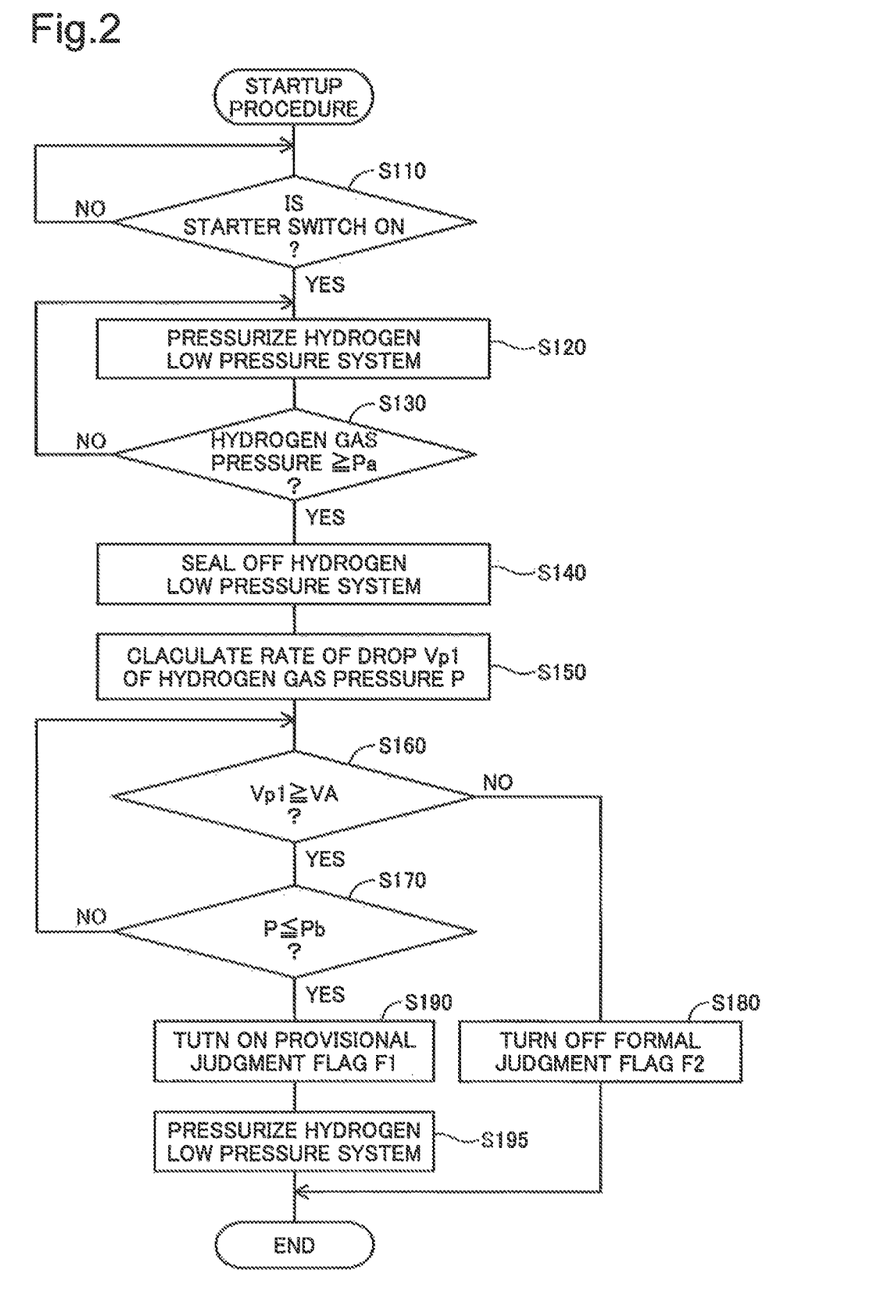
FIG. 2 is a flow chart showing a startup procedure for detecting a hydrogen gas leak.
Figure 3:
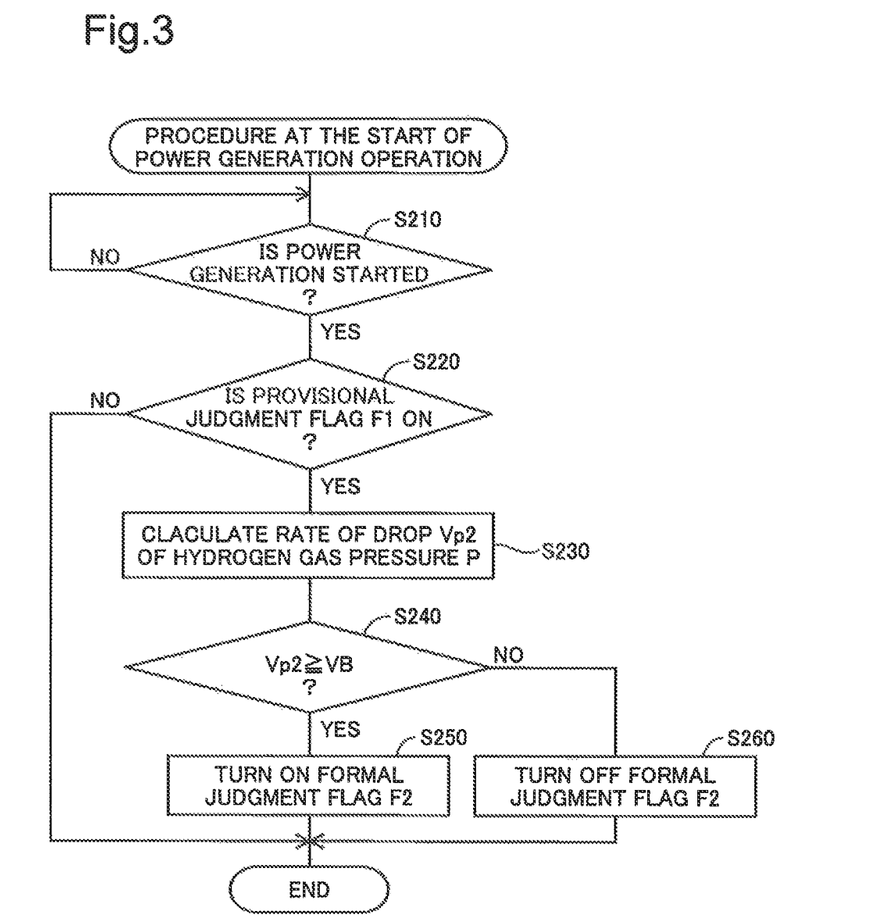
FIG. 3 is a flow chart showing a procedure at the start of the power generation operation to detect a hydrogen gas leak.

FIG. 2 is a flow chart showing a startup procedure for detecting a hydrogen gas leak. FIG. 3 is a flow chart showing a procedure at the start of the power generation operation to detect a hydrogen gas leak. The startup procedure is performed by the control unit 100 after the power is turned on. The procedure at the start of the power generation operation is performed by the control unit 100 subsequent to the startup procedure.

Figure 4:
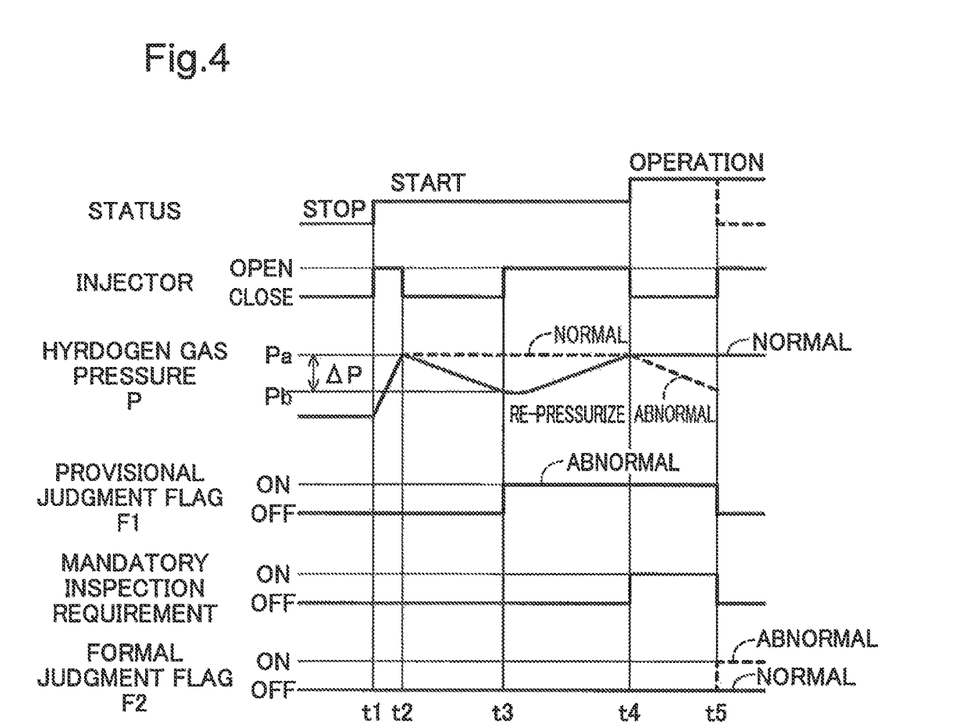
FIG. 4 is an illustrative drawing showing various conditions during execution of the startup procedure and the procedure at the start of the power generation operation.

FIG. 4 is an illustrative drawing showing various conditions and temporal changes of parameters during execution of the startup procedure and the procedure at the start of the power generation operation. The drawing shows the conditions of the fuel cell stack 40, open-shut status of the injector, hydrogen gas pressure P, a provisional judgment flag F1, mandatory inspection requirement conditions, and a formal judgment flag F2, respectively.

Next, the startup procedure will be described in reference to FIGS. 2 and 4. It is assumed that the provisional judgment flag F1 and the formal judgment flag F2 are cleared to the "off" position (value=0) prior to the execution of the startup procedure. Once the power is on, the control unit 100 first makes a judgment whether the starter switch is turned on or not (Step S110) as shown in FIG. 2. If a judgment is made that the switch is not on, the system waits for the turn-on by repeatedly carrying out Step S110. Once a judgment is made in Step S110 that the switch is turned on, the status of the fuel cell stack 40 moves on to startup (time t1 in FIG. 4), and the control unit 100 pressurizes the hydrogen low pressure system HL (Step S120). In other words, the injector 55 is opened for pressurization (time t1 in FIG. 4). Since the purge valve 58 is closed at the startup, the hydrogen low pressure HL is pressurized just by opening the injector 55.

As shown in FIG. 4, the pressurization of the hydrogen low pressure system HL continues from the time t1 on to gradually increase the hydrogen gas pressure P detected by the pressure sensor 56. As shown in FIG. 2, the control unit 100 makes a judgment whether the hydrogen gas pressure reached or exceeded the first gas pressure Pa or not (Step S130), and closes the injector 55 when the first gas pressure Pa is reached to seal off the hydrogen low pressure system HL (Step S140 and time t2 in FIG. 4). If the hydrogen gas pressure P does not reach the first gas pressure Pa, the control unit 100 returns the process to Step S120 to continue pressurization of the hydrogen low pressure system HL.

If there is any gas leak in the hydrogen low pressure system HL under a condition where the hydrogen low pressure system HL is sealed off after being supplied with hydrogen gas, or when the fuel cell vehicle 20 is left undriven for a long period of time, the hydrogen gas pressure P detected by the pressure sensor 56 gradually drops down as shown in FIG. 4 between the time t2 and t3. The reason for the drop oil the hydrogen gas pressure P after the vehicle is left undriven for a long period of time is that air gets into the hydrogen low pressure system HL from the side of the air supply and discharge mechanism 60 permeating through the single cell during the left period, and the hydrogen reacts with oxygen in a combustion reaction, which consumes the hydrogen.

Therefore, the cause of the drop of hydrogen gas pressure is judged in Steps S150 and S190, described later, without distinguishing whether the pressure drop is associated with a gas leak in the hydrogen low pressure system or with the fuel cell vehicle 20 that was left undriven for a long period of time, and when a given level of drop in the pressure P of hydrogen gas is detected, the provisional judgment flag F1 is made to turn on to provide a provisional warning of a gas leak. These procedures will be described in detail below.

After sealing off the hydrogen low pressure system HL, the control unit 100 calculates a rate of drop Vp1 in the hydrogen gas pressure P detected by the pressure sensor 56 (Step S150). More specifically, the hydrogen gas pressure P detected by the pressure sensor 56 is obtained as an initial pressure P1, and after waiting for a certain period of time (e.g. 1 second), the hydrogen gas pressure P detected by the pressure sensor 56 after the waiting period is obtained as a final pressure P2, and subsequently, the initial pressure P1 is subtracted from the final pressure P2 to calculate the pressure drop ΔP and determine the rate of pressure drop Vp1 by dividing ΔP by the unit time.

The control unit 100 makes a judgment whether the hydrogen gas pressure P dropped down from the first gas pressure Pa to a second gas pressure Pb during a given period of time by means of judging whether the rate of pressure drop Vp1 obtained in Step S150 has reached or exceeded a prescribed value VA (Step S160) and also judging whether the hydrogen gas pressure P has dropped down to the second gas pressure Pb or lower (Step S170). The prescribed value VA, which is a threshold value of the rate of pressure drop Vp1 was set up in consideration of the pressure difference between the first gas pressure Pa and second gas pressure Pb as well as the given period of time mentioned above. The value of the pressure difference was determined taking into account the volume of the hydrogen low pressure system HL, which corresponds to the amount of hydrogen needed for combustion of the air in the same volume.

Once a judgment is made in Step S160 that the rate of drop Vp1 of hydrogen gas pressure P is below the prescribed value VA, the control unit 100 makes the formal judgment flag F2 turn off (=value at 0) assuming that the pressure P is unlikely to drop down to the second gas pressure Pb during the given period of time described above (Step S180). In other words, the formal judgment flag F2 turns off indicating no gas leak (i.e. normal) as a result of formal judgment. According to this aspect, it is possible to make a judgment of no gas leak without waiting for the actual time lapse described above. After the execution of Step S180, the control unit 100 ends the startup procedure.

Meanwhile, if a judgement is made in Step S160 that the rate of drop Vp1 is no less than the prescribed value VA, the control unit 100 proceeds to Step S170 to make a judgment whether the hydrogen gas pressure P dropped top the second gas pressure Pb or lower. If the pressure is equal to the second gas pressure P or lower (time t3 in FIG. 4), the provisional judgment flag F1 is turned on (=value at 1) (Step S190) while the hydrogen low pressure system HL is pressurized (Step S195). In other words, as shown in FIG. 4 at the time t3, the provisional judgment flag F1 turns on indicating a gas leak (i.e. abnormal) as a result of provisional judgment, and the injector 55 for pressurization becomes an open state. After the execution of Step S195, the control unit 100 ends this startup procedure. As shown in FIG. 4, if the inject is opened at the time t3, the hydrogen pas pressure P gradually increases thereafter. The rate of this increase of the hydrogen gas pressure P is lower than the rate of increase of the same during the initial pressurization period from t1 to t2, which is because the amount of hydrogen gas supply is reduced from that of the initial pressurization period by controlling the aperture of the injector 55. The amount of supply of hydrogen gas does not necessarily have to be reduced from that of the initial pressurization period, and it may also be increased or maintained at the same level.

Next, the procedure at the start of the power generation operation will be described in reference to FIGS. 3 and 4. When the startup procedure of FIG. 2 is complete, the control unit 100 starts the procedure at the start of the power generation operation. Once the procedure at the start of the power generation operation is started, the control unit 100, as shown in FIG. 3, first makes a judgment whether the power generation operation of the fuel cell stack 40 is started or not (Step S210). More specifically, it judges whether the power generation operation is started or not by the fuel cell stack 40 by comparing the open circuit voltage (OCV) of the fuel cell stack 40 detected by the voltage sensor 43 against a reference value before the power generated by the fuel cell stack 40 is supplied to the load. If a judgment is made that the power generation operation has not started yet, the system waits for the start of the power generation operation by repeatedly carrying out Step S210.

In the present embodiment, it was assumed that the re-pressurization of the hydrogen low pressure system HL performed in Step S195 of FIG. 2 is to be continuously executed during the period until the start of the power generation operation. Instead of this configuration, the system may have a configuration where the hydrogen low pressure system HL is once sealed off with the injector 55 in a closed state when the hydrogen gas pressure P is found to be no less than the prescribed value after the execution of Step S195.

Once a judgment is made in Step S210 that the power generation operation has started, another judgment is made whether the provisional judgment flag F1 is on or not (Step S220). In other words, it is judged whether the provisional flag F1 is turned on by the startup procedure of FIG. 2. If a judgment is made that the provisional flag F1 is not on, the control unit 100 ends the procedure at the start of this operation since the formal judgment flag F2 is already set in an off (normal) state.

If a judgment is made in Step S220 that the provisional flag F2 is on, the control unit 100 calculates the rate of drop Vp2 of the hydrogen gas pressure P detected by the pressure sensor 56 (Step S230). This calculation process is performed in a similar way to that of Step S150 of FIG. 2, and the difference from Step S150 is that the time period for sampling the hydrogen gas pressure P is made longer (2 to 5 seconds, for example) than the unit time. The reason for the longer interval is to improve the precision in detecting a gas leak. However, the time interval does not necessarily have to be longer than the unit time, and it may also be shorter than or equal to the unit time.

Subsequently, the control unit 100 makes a judgment whether the rate of drop Vp2 obtained in Step S230 has reached or exceeded a prescribed value VB. Even if there is no hydrogen gas leak from the hydrogen low pressure system HL, the hydrogen gas pressure P drops slightly due to the cross leak between the anode and cathode of the fuel cell stack 40. The prescribed value VB is set to prevent any erroneous detection of a drop in pressure due to the cross leak as hydrogen gas leak.

At the start of the fuel cell stack 40, there are two causes of the drop of the hydrogen gas pressure P, as explained earlier, one is a gas leak in the hydrogen low pressure system HL and the other is that the fuel cell vehicle 20 is left undriven for a long period of time. Meanwhile, since the initial pressurization has been performed in Step S120 of the startup procedure of FIG. 2, the air mixed into the hydrogen gas circulation system due to the vehicle left undriven for a long period of time is made to react with the introduced hydrogen gas in a combustion reaction, and to be discharged in the form of wafer. Therefore, at the start of the power generation operation when the process of Step S230 is executed, the gas leak in the hydrogen low pressure system HL is the only remaining cause of the drop of the hydrogen gas pressure P. Thus, when a judgment is made that the rate of drop Vp2 determined in Step S230 is no less than the prescribed value VB, the control unit 100 makes the formal judgment flag F2 turn on (=value at 1) (Step S250). In other words, as a result of formal judgment, the formal judgment flag F2 is turned on, which indicates a gas leak in the hydrogen low pressure system HL (i.e. abnormal) (dash line of time t5 in FIG. 4).

Meanwhile, if a judgment is made in Step S240 that the rate of drop Vp2 of the hydrogen gas pressure P is below the prescribed value VB, the formal judgment flag F2 is turned off (=value at 0) (Step S260). In this case, the provisional judgment flag F1 is turned on, but that is because of the vehicle left undriven for a long period of time and it may be assumed that there is actually no gas leak in the hydrogen low pressure system HL. For this reason, the formal judgment flag F2 is kept in an off state as a result of formal judgment indicating that there is no gas leak in the hydrogen low pressure system HL (i.e. normal) (solid line at time t5 in FIG. 4). After the execution of Step S250 or S260, the control unit 100 ends the procedure at the start of the power generation operation.

If the formal judgment flag F2 is turned on, the power generation operation of the fuel cell stack 40 is stopped by another routine (dash line of time t5 in FIG. 4). The system may draw attention of the operator by issuing a warning with sounds and displays at the same time as the power generation operation stops.

The processes of Steps S110 and S120 during the startup procedure of FIG. 2 correspond to the functions performed by the initial pressurization unit 102 (FIG. 1). The processes of Steps 150 to S190 during the startup procedure of FIG. 2 and the process of Step S120 during the procedure at the start of the power generation operation of FIG. 3 correspond to the functions performed by the re-pressurization and gas leak detection unit 104.

C. Effects of Control by the Hydrogen Gas Circulation System

According to the fuel cell system 30 with the configuration described above, the air mixed into the hydrogen low pressure system HL due to the vehicle left undriven for a long period of time is removed by a combustion reaction with hydrogen by means of pressurizing the hydrogen low pressure system HL with the initial pressurization unit 102. Then, the system is re-pressurized by the re-pressurization and gas leak defection unit 104 to detect a hydrogen gas leak. Therefore, it may prevent erroneous detection of hydrogen gas leak caused by the mixture of air in the hydrogen low pressure system HL. Also, since the fuel cell system 30 only makes a provisional judgment at the startup and the formal gas leak detection is performed at the start of the power generation operation, the gas leak detection does not delay the start of the power generation.

D. Air System Control

Aside from the configuration to detect a hydrogen gas leak described above, the fuel cell vehicle 20 of the present embodiment comprises a configuration that detects failures of the dividing shut valve 63 and the pressure adjusting shut valve 67 provided in the air supply and discharge mechanism 60 as an air system. Conventionally, the parts installed in the air system do not have much impact on the detection results of the pressure sensor in case of a failure within the normal operation range (condition). For this reason, detection of failures in the parts installed in the air system has conventionally been difficult. To deal with this, in the present embodiment, failure detections of the dividing shut valve 63 and the pressure adjusting shut valve 67 installed in the air supply and discharge mechanism 60 are made possible by increasing the rotational speed of the air compressor 62 and the amount of air flowing in the air supply and discharge mechanism 60 to enhance the sensitivity of the pressure sensor. This procedure of failure detection (hereinafter called "air system failure detection procedure") is performed by the control unit 100.

Figure 5:
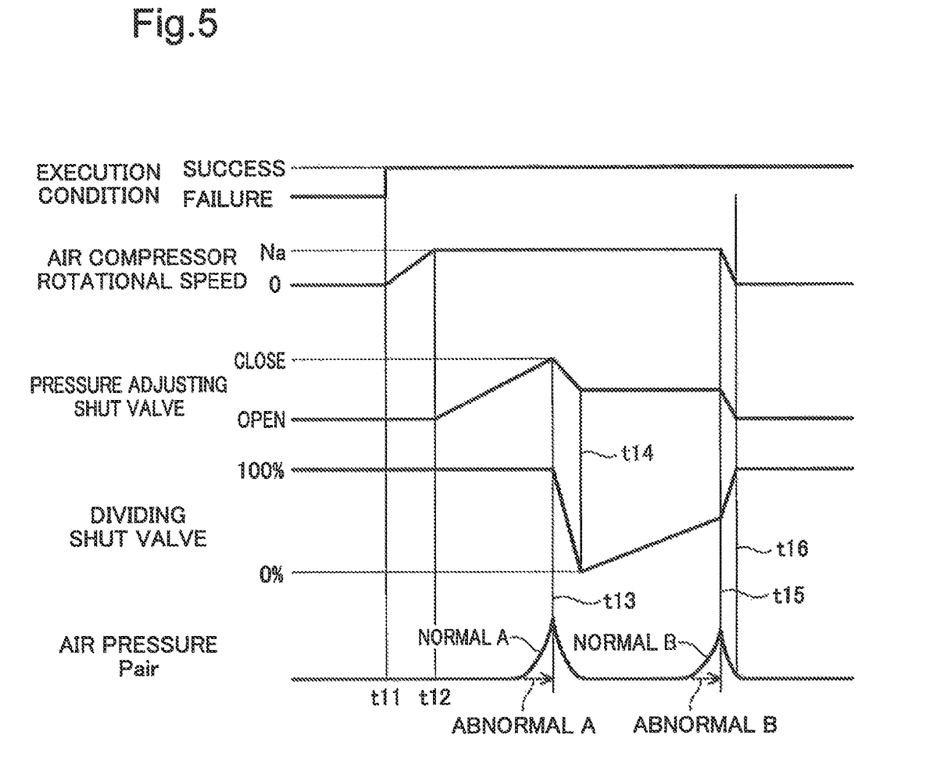
FIG. 5 is an illustrative drawing showing various conditions during execution of the air system failure detection procedure and temporal changes in parameters thereof.

FIG. 5 is an illustrative drawing showing various conditions during execution of the air system failure detection procedure and temporal changes in parameters thereof. The drawing shows success and failure in meeting the execution condition, the rotational speed (more precisely, number of rotations per unit time) of the air compressor 62, the open-shut status of the pressure adjusting shut valve 67, the aperture of the dividing shut valve 63, and the air pressure $P_{air}$ detected by the pressure sensor 65 provided in the air supply and discharge mechanism 60, respectively.

The "success and failure in meeting the execution condition" indicates whether the condition required for carrying out the air system failure detection procedure is met or not. The execution condition is that at least one of the following conditions a) to c) is met after the start of the fuel cell stack 40 and the power generation operation:
a) The shift lever (not shown) is in the "P" or "N" range.
b) The vehicle speed is less than 3 km/hr.
c) The accelerator aperture is less than 5%.

The air system failure detection procedure will be described below in reference to FIG. 5. The air system failure detection procedure is achieved by controlling every part of the fuel cell system 30 by the control unit 100. As shown in the drawing, when the execution condition is met, the control unit 100 increases the rotational speed of the air compressor 62 (time t1). Here, the "rotational speed" means the rotational speed, per unit time, and more precisely the number of rotations per unit time. The rotational speed of the air compressor 62 is gradually increased to reach a given speed Na at the time t12. After the time t12 until t14, described later, the air compressor 62 keeps its rotational speed at the given speed Na. Na is a rotational speed fast enough to affect the detection results of the pressure sensor (i.e. to give enough pressure sensitivity).

At the start of the fuel cell stack 40, the aperture of the dividing shut valve 63 is 100% (condition where all air flows toward the fuel cell stack 40 from the air compressor 62), and the pressure adjusting shut valve 67 is in an open state. When the rotational speed of the air compressor reaches the given speed Na, the control unit 100 controls the pressure adjusting shut valve 67 from open to close (time t12). When the pressure adjusting shut valve 67 is controlled from open to shut with the aperture of the dividing shut valve 63 at 100%, the air pressure $P_{air}$ detected by the pressure sensor 65 gradually rises as long as the pressure adjusting shut valve 67 has no failure (i.e. normal). Meanwhile, if the pressure adjusting shut valve 67 has a failure (i.e. abnormal), it does not close and does not cause the air pressure $P_{air}$ to rise. Therefore, based on whether the air pressure $P_{air}$ detected by the pressure sensor 65 rises or not on and after the time t12, the control unit 100 may make a judgment whether the pressure adjusting shut valve 67 is normal (normal A) or abnormal (abnormal A) (time t13).

On or after the time t13, the control unit 100 makes the pressure adjusting shut valve 67 half open and sets the aperture of the dividing shut valve 63 at 0% (all flows toward the bypass 69) (time t14). On or after the time t14, the control unit 100 increases the aperture of the dividing shut valve 63 from 0%. Then, if the dividing shut valve 63 has no failure (i.e. normal), the air pressure $P_{air}$ detected by the pressure sensor 65 gradually increases. On the contrary, if the dividing shut valve 63 has a failure (i.e. abnormal), the dividing shut valve 63 does not open to cause the air pressure $P_{air}$ to rise. Therefore, on or after the time t14, depending on whether the air pressure $P_{air}$ detected by the pressure sensor 65 rises or not, the control unit 100 may make a judgment whether the dividing shut valve 63 is normal (normal B) or abnormal (abnormal B) (time t15). On or after the time t14, the pressure adjusting shut valve 67 is opened and the dividing shut valve 63 sets its aperture at 100% (time t16).

As described above, by means of controlling the rotational speed of the air compressor 62, open-shut status of the pressure adjusting shut valve 67, and the aperture of the dividing shut valve 63 by the air system failure detection procedure, the control unit 100 may make judgments on failures of the pressure adjusting shut valve 67 and the dividing shut valve 63 at and after the start of the power generation operation of the fuel cell stack 40.

The functional part of the control unit 100 described above that performs the function of raising the rotational speed of the air compressor and maintaining it for a given period of time may be called a "rotation speed control unit 106" in the present specification. Also, the functional part of the control unit described above that achieves the function of detecting a failure of the valve based on the pressure fluctuation during the given period of time may be called a "failure detection unit 108" in the present specification.

The air system failure detection procedure described above may be performed by the occupant of the fuel cell vehicle 20 while under driving, but instead, the procedure may be taken at a plant inspection of the fuel cell vehicle 20 or an inspection in a repair shop after shipment. When the rotational speed of the air compressor 62 is raised, noise is generated to the discomfort of the occupants of the vehicle, which may be avoided if the inspection is performed at the plant or the repair shop after the shipment.

E. Modified Examples

Example 1

In the previous embodiment, the formal gas leak detection was performed at the start of the power generation operation, but the timing of this detection does not necessarily have to be at the start of the power generation operation. Such detection may be performed at any time once the hydrogen gas pressure P has reached the given pressure Pa.

Example 2

In the previous embodiment, the control unit 100 made a judgment on a pressure drop of hydrogen gas to a given level by means of judging whether the rate of drop Vp1 in the hydrogen gas pressure P had reached or exceeded the prescribed value VA (Step S160 of FIG. 2) and judging whether the hydrogen gas pressure P had become equal to the second gas pressure Pb or lower (Step S170 of FIG. 2). However, such judgment may be made based on a given level of drop found in either of Steps S160 and S170.

In the embodiment described above, as shown in FIG. 5, the rotational speed of the air compressor is raised to be kept at that level for a given period of time, and any valve failure is detected based on the pressure fluctuations during the same period. However, another aspect may be adopted where hydrogen gas leak detection is performed without any such failure detection of the air system (see FIGS. 2 and 3, for example).

Part of the functions implemented by the software configuration in the above embodiment may be configured by hardware (for example, integrated circuit), and part of the functions implemented by the hardware configuration may be configured by software.

The present invention is not limited to the embodiments or modified examples described above, and may be implemented in various configurations within the range not to deviate from the spirit of the invention. For example, the technical characteristics of the embodiments corresponding to those in each aspect described in the "Disclosure of the Invention" may be replaced or combined as appropriate in order to solve the whole or part of the above problem or to achieve the whole or part of the effects described above. Also, the components of embodiments and modified examples described above other than those described in independent claims are additional ones, and may be deleted as appropriate.

What is claimed is:

1. A fuel cell system provided with a fuel cell comprising:
   a hydrogen gas circulation system that supplies hydrogen gas to the fuel cell, while merging the hydrogen gas discharged from the fuel cell with the newly supplied hydrogen gas;
   a hydrogen gas supply valve that controls the amount of hydrogen gas supplied to the hydrogen gas circulation system;
   a pressure detection unit that detects the internal pressure of the hydrogen gas circulation system;
   an initial pressurization unit that is configured to pressurize the hydrogen gas circulation system by temporarily opening the hydrogen gas supply valve and then seal off the hydrogen gas circulation system by closing the hydrogen gas supply valve at the startup of the fuel cell after a starter switch for the fuel cell is turned on; and
   a re-pressurization and gas detection unit that is configured to re-pressurize the hydrogen gas circulation system after the pressurization by the initial pressurization unit by opening the hydrogen gas supply valve when a given level of drop is found in the pressure detected by the pressure detection unit while the hydrogen gas circulation system is sealed off, and detect a hydrogen gas leak from the hydrogen gas circulation system based on the pressure detected by the pressure detection unit in a given timing after the re-pressurization.

2. The fuel cell system of claim 1, wherein the given timing is at the start of the power generation operation of the fuel cell.

3. The fuel cell system of claim 1, wherein the hydrogen gas circulation system comprises:
   a hydrogen gas supply channel that passes the hydrogen gas supplied by the hydrogen supply valve to the fuel cell; and
   a circulation channel that circulates the hydrogen gas discharged from the fuel cell to the hydrogen gas supply channel.

4. The fuel cell system of claim 1 further comprising:
   an air system including a channel and a valve for supplying air to the fuel cell;
   an air compressor that sends air to the air system;
   an air pressure detection unit that detects the internal pressure of the air system;

a rotational speed control unit that raises the rotational speed of the air compressor and keeps the speed for a given period of time, and a failure detection unit that detects a failure of the valve based on the pressure fluctuations during the given period of time detected by the air pressure detection unit.

5. The fuel cell system of claim 1, wherein the re-pressurization and gas detection unit is configured such that it does not re-pressurize the hydrogen gas circulation system after the pressurization by the initial pressurization unit by opening the hydrogen gas supply valve when a given level of drop is not found in the pressure detected by the pressure detection unit, and such that it does not detect a hydrogen gas leak from the hydrogen gas circulation system based on the pressure detected by the pressure detection unit in a given timing after the re-pressurization when a given level of drop is not found in the pressure detected by the pressure detection unit.

6. A hydrogen gas leak detection method for a fuel cell system provided with a fuel cell, a hydrogen gas circulation system that supplies hydrogen gas to the fuel cell while merging the hydrogen gas discharged from the fuel cell with the newly supplied hydrogen gas, a hydrogen gas supply valve that controls the amount of hydrogen gas supply to the hydrogen gas circulation system, and a pressure detection unit that detects the internal pressure of the hydrogen gas circulation system, comprising:

pressurizing the hydrogen gas circulation system by temporarily opening the hydrogen gas supply valve and then sealing off the hydrogen gas circulation system by closing the hydrogen gas supply valve at the startup of the fuel cell after a starter switch for the fuel cell is turned on; and re-pressurizing the hydrogen gas circulation system by opening the hydrogen gas supply valve when a given level of drop is found in the pressure detected by the pressure detection unit while the hydrogen gas circulation system is sealed off after the pressurization, and detecting a hydrogen gas leak from the hydrogen gas circulation system based on the pressure detected by the pressure detection unit in a given timing after the re-pressurization.

7. The hydrogen gas leak detection method of claim 6, wherein the given timing is at the start of the power generation operation of the fuel cell.

8. The hydrogen gas leak detection method of claim 6, wherein the fuel cell system further includes:

an air system that includes a channel and a valve for supplying air to the fuel cell;

an air compressor for sending air to the air system; and an air pressure detection unit that detects the internal pressure of the air system, wherein the hydrogen gas leak detection method comprises:

raising the rotational speed of the air compressor and keeping the speed for a given period of time; and detecting any failure of the valve based on the pressure fluctuations during the given period of time detected by the air pressure detection unit.

9. The hydrogen gas leak detection method of claim 6, wherein re-pressurizing of the hydrogen gas circulation system does not occur and detection of a hydrogen gas leak from the hydrogen gas circulation system does not occur when a given level of drop is not found in the pressure detected by the pressure detection unit in a given timing after the pressurization.

* * * * *